(12) United States Patent  
Evans

(10) Patent No.: US 8,429,078 B2  
(45) Date of Patent: Apr. 23, 2013

(54) PAYMENT PROCESSING DEVICE SIGNATURE VERIFICATION

(75) Inventor: James Douglas Evans, Livermore, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 814 days.

(21) Appl. No.: 12/208,700

(22) Filed: Sep. 11, 2008

(65) Prior Publication Data

US 2010/0063922 A1    Mar. 11, 2010

(51) Int. Cl.
*G06Q 40/00* (2006.01)

(52) U.S. Cl.
USPC .......................................................... 705/44

(58) Field of Classification Search ...................... 705/44
See application file for complete search history.

(56) References Cited

U.S. PATENT DOCUMENTS

| | | | |
|---|---|---|---|
| 6,148,093 A * | 11/2000 | McConnell et al. | 382/119 |
| 7,140,541 B2 | 11/2006 | Stelzer | |
| 7,289,959 B2 | 10/2007 | Praca | |
| 2003/0117476 A1* | 6/2003 | Cross et al. | 347/107 |
| 2007/0269083 A1 | 11/2007 | Haid | |
| 2007/0292002 A1 | 12/2007 | Kaplan | |
| 2008/0008363 A1 | 1/2008 | Bonalle et al. | |
| 2008/0010218 A1 | 1/2008 | Zank | |
| 2008/0037842 A1 | 2/2008 | Gutta et al. | |
| 2008/0073427 A1 | 3/2008 | Voigt | |
| 2008/0126260 A1 | 5/2008 | Cox et al. | |

* cited by examiner

*Primary Examiner* — Lindsay M. Maguire

(74) *Attorney, Agent, or Firm* — Kilpatrick Townsend & Stockton LLP

(57) ABSTRACT

Devices and methods for signature authentication of a bearer of a payment processing device during financial transactions are provided. The payment processing device is provided with a signature input panel configured to receive user input signature information for the purpose of authenticating the signature. After the bearer of the payment processing device writes her signature into the signature input panel, the input signature information is compared to a pre-stored signature profile stored in the payment processing device for authentication.

16 Claims, 7 Drawing Sheets

PAYMENT PROCESSING DEVICE SIGNATURE VERIFICATION

CROSS-REFERENCE TO RELATIONS APPLICATIONS

None

FIELD OF THE INVENTION

Aspects and embodiments of the present invention relate in general to authentication of the identity of the bearer of a payment processing device, such as a credit card, during financial transactions. More specifically, aspects of the present invention provide methods and payment processing devices for authentication of a user through validation of the user's signature to prevent fraudulent use during financial transactions.

BACKGROUND

Currently, a variety of devices and methods have been developed in an attempt to improve authentication fidelity and to safeguard personal identity and sensitive private information. These devices and methods have grown in importance in light of the increasing security threat due to the rapid advancements in networking and mobile communication technologies. However, certain authentication technologies in use today are still based on the traditional "knowledge-based factor" or "possession-based factor" identification and verification approaches. In a typical knowledge-based authentication approach, only one authentication factor (such as knowledge of a password) is required in order to gain access to a system. In a possession-based authentication approach, possession of one authentication factor (e.g. possession of card or token) is required in order to gain access to a system. More recently, some of these technologies have been deployed in combination as two factor authentication schemes wherein both knowledge-based and possession-based factors are required simultaneously for authentication. These types of authentications have recently gained increasing acceptance. An example of such authentication scheme is the common bank card transaction wherein the card itself represents the authorizing possession factor (bearer has the card). The corresponding password represents the authorizing factor that is known only to the account holder. However, despite these apparent additional layers of security, misplacement of the possession factor (such as lost or stolen cards) and a breach of the knowledge factor (such as compromised password) remain problematic for these types of transactions. As a result, when the possession factor (e.g. card) and the password are simultaneously compromised or duplicated, there is no apparent suitable countermeasure for the breach as this technique cannot reliably authenticate the true identity of the holder of the device.

In a typical financial transaction using the traditional two factor verification system, a bearer of a typical payment processing device (e.g. credit card) presents the card to a merchant for the purchase of an item. The merchant takes the card presented by the bearer and swipes the card through a magnetic strip card reading device or other similar device. The information contained on the magnetic strip of the card is read and transmitted to the issuing financial institution. The financial institution then interrogates its database of active cards to the information received. The institution also verifies whether the amount of credit sought exceeds the amount available. If the financial institution verifies that the card is active and that the credit limit will not be exceeded (for a credit transaction) or that there are sufficient funds to complete the transaction (for a debit transaction), and/or other verification parameters are satisfactorily authenticated, an approval is provided to the merchant for completion of the purchase.

After an approval is determined by the financial institution, an authorization code is prepared and transmitted to the merchant. The merchant returns the card to the bearer after the authorization code has been received and the merchant then requires a signature from the bearer, authorizing the transaction. The bearer of the card signs a sales slip. The merchant verifies the signature of the bearer against a signature on the back of the card and the transaction is then complete.

Within these conventional authentication schemes, verification of the transaction occurs at two points in the transaction. The first authorization occurs at the financial institution that issues the card, wherein an electronic database is used to check valid card numbers. The second authorization occurs at the merchant where the signature verification is performed. Merchants, however, may forget to compare the signature obtained from the individual against the signature on the back of the card. Another problem is that the merchants generally do not have the facility to accurately compare the signature on the back of the card to the signature obtained from the bearer of the card to determine that the signatures were made by one individual. Currently, conventional cards do not have a capability to provide the merchant with authentication of the identity of the bearer apart from comparing the signatures.

In light of these security risks, the use of portable payment processor devices (e.g. credit cards) by un-authorized bearers continues to present a difficult and costly problem for financial institutions.

SUMMARY OF THE INVENTION

According to an embodiment, a payment processing device is disclosed. The payment processing device comprises a signature input panel that is configured to receive input signature information from a user. A processor (e.g. a logic chip) is also provided in the payment processing device. The processor is coupled to the signature input panel and configured to perform authentication of the input signature by comparing the input signature information against a pre-stored user signature profile that is stored within the payment processing device. The payment processing device further comprises a display unit coupled to the processor for displaying a message representing the results of the authentication of the input signature information.

Aspects of the invention also provide a method of authenticating a bearer of the payment processor device (hereinafter called "user") for a financial transaction. A payment processing device to be used by the user for a financial transaction is provided and before the financial transaction can be approved, a user input signature information is received by a signature input panel provided in the payment processing device. Then, the payment processing device authenticates the user input signature information by comparing the user input signature information to a pre-stored user signature profile. The results of the authentication of the user input signature information is displayed on a display unit provided in the payment processing device.

Other systems, methods, and/or products will be or become apparent to one of ordinary skill in the art upon review of the following drawings and detailed description. It is intended that all such additional systems, methods, and/or products be

DETAILED DESCRIPTION

Figure 1:
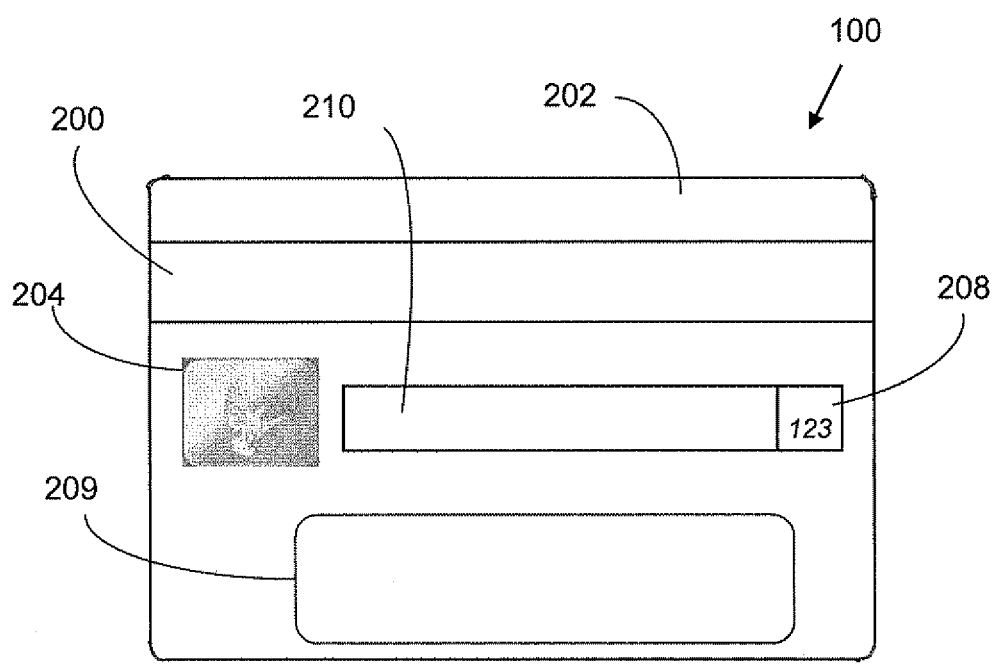
FIG. 1 is an illustration of a payment processing device according to one embodiment.

According to one embodiment, a card (e.g. credit card, debit card, prepaid card or the like) embodiment of a payment processor device 100 for conducting financial transactions is illustrated in FIG. 1. The card 100 is provided with individual components so financial transactions may be accomplished in a safe, secure, and convenient process.

The card 100, has two faces and FIG. 1 shows one of the two faces that is generally referred to as the back side 202 of the card 100. On the opposite face (not shown) of the card 100, a card serial number can be provided, wherein the serial number is a unique identifier for the card 100. The serial number can comprise letters or a combination of numbers, letters and symbols.

The back side 202 of the payment processor card 100 is provided with a communication element 200. In the illustrated example, the communication element 200 is a magnetic strip that is used to identify the card 100 through a conventional magnetic strip reader. In other embodiments (not shown), the communication element 200 may be a wireless radio frequency (RF) transmitter, an optical transmitter, or other communication device.

In addition to the magnetic strip 200, a hologram 204 can be provided on at least one face of the card 100 to allow a merchant to visually identify that the card 100 has been officially produced by the issuing institution. A security code feature 208 is also provided at the back of the card 100 for further identification purposes if needed. The card 100 is provided with a signature input panel 210 that is configured to capture the characteristic parameters of a signature written on it. This signature input panel 210 is not a mere blank space where the card owner's signature is written in visible ink, as on a conventional credit card. Rather, the signature input panel 210 may be a pressure-sensitive data input device on which a signature is written with a stylus, which may be similar to those commonly used on many personal digital assistant devices (PDAs) and point-of-sale payment devices. The signature input panel 210 captures multiple characteristic parameters about the signature.

In other embodiments, the signature input panel may be based on any of a variety of input device technologies, such as resistive, surface acoustic wave, capacitive, infrared, strain gauge, optical imaging, dispersive signal technology, or the like.

Figure 2:
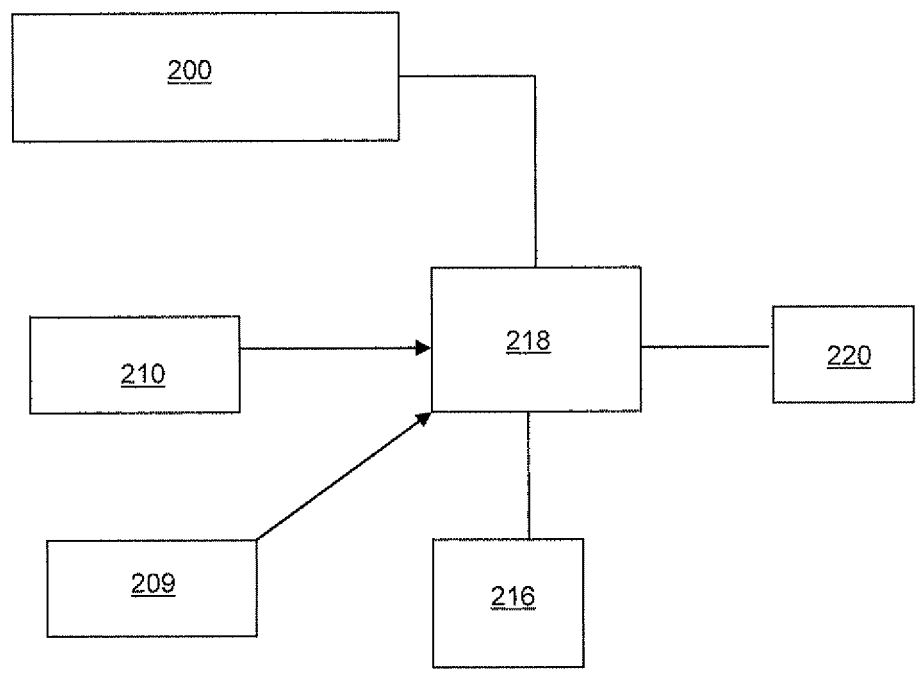
FIG. 2 is a schematic view of components within a payment processing device embodiment.
Figure 3:
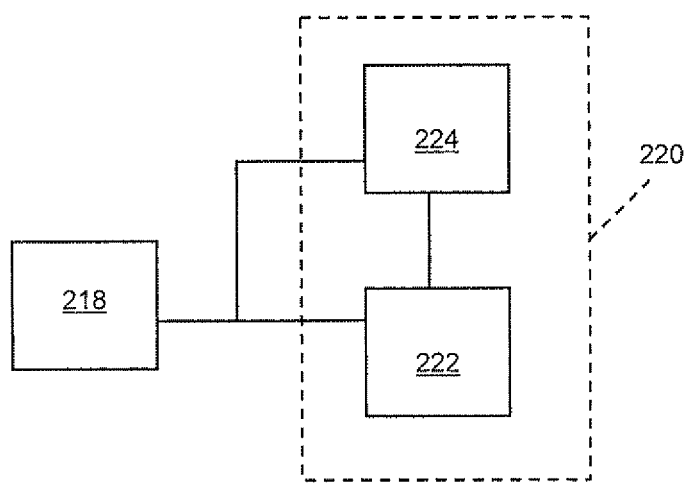
FIG. 3 is a schematic illustration of an example of a power source for the payment processing device.

FIG. 2 is a schematic illustration of the components of the card 100. In the illustrated embodiment, a power source 220 (e.g., a battery) is connected to a signature input panel 210 that in turn is connected to a processor (e.g. a logic chip) 218. The power source 220 is connected by appropriate wirings (not shown) to supply electrical power to various other components of the card 100. The power source 220 is configured to provide sufficient electrical current to operate the signature input panel 210 and the processor 218 to function for authentication purposes. In one embodiment, the power source 220 provided on the payment processing device 100 may be a rechargeable thin film type battery with a photovoltaic layer for charging the thin film battery. FIG. 3 is a schematic block diagram illustrating such example of the power source 220. The power source 220 comprises a capacitor 222 configured to supply electrical power to the processor 218 as well as other components of the card 100 when necessary. A piezo pad 224 is connected to the capacitor 222 for providing electricity to recharge the capacitor 222. During normal handling of the card 100, the card 100 gets flexed back and forth and also flexes the piezo pad 224. When the piezo pad 224 is flexed, it generates electricity and charges the capacitor 222. The piezo pad 224 can also be connected directly to the processor 218 and provides power to the processor 218 as well as other components of the card 100. The piezo pad 224 may be positioned along any section of the card 100 and may be provided as a surface feature of the card 110 or embedded within the body of the card 100.

Figure 4:
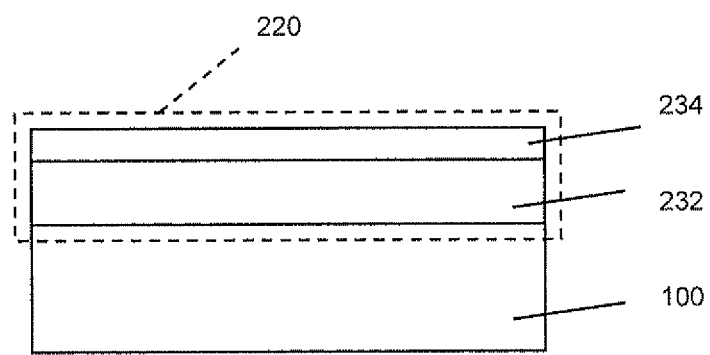
FIG. 4 is a schematic illustration of another example of the power source for the payment processing device.

In another embodiment, the power source 220 may be a rechargeable thin film type battery 232 with a photovoltaic layer 234 for charging the thin film battery 232 as illustrated in FIG. 4. The thin film battery 232 and the photovoltaic layer 234 may be laminated together on to the card 100. The photovoltaic layer 234 converts the light that strikes the photovoltaic layer 234 into electrical energy that can be stored in the rechargeable thin film battery 232 provided underneath the photovoltaic layer 234. The photovoltaic layer 234 may be appropriately positioned on the card 100 to be exposed to light during normal use of the card 100 and has a surface area optimized to capture sufficient amount of light to generate electricity.

In some embodiments, the power source 220 includes an internal battery having a battery life expected to last until or beyond the expiration date of the card 100. In other embodiments (not shown), power and ground contacts may be provided at the front or back surface of the card 100 to received power from an external power source. An external power source may be used to recharge an internal battery or to operate on external power.

The signature input panel 210 is configured such that a person bearing the card 100 provides her signature information (the "input signature information") to the processor 218 by writing her signature in the signature input panel 210. The processor 218 is configured with appropriate data storage memory (whether it be provided as a separate memory chip connected to the processor or provided on the processor chip itself to store the input signature information as well as any other information necessary to carry out the operation of the payment processing device 100 according to the methods disclosed herein.

Once the input signature information is provided to the processor 218, the processor 218 performs an authentication of the input signature information by comparing the input signature information against the authorized card owner's signature profile that is pre-stored in the processor's memory. If the authentication check indicates that the input signature information matches the pre-stored signature profile, the processor 218 displays a message on the display unit 209 that the card bearer's signature has been verified against the signature profile of the authorized card owner. The merchant can then safely allow the card bearer to pay for the service/goods using the card 100. When the payment processing device 100 is presented, the preferred business protocol for the merchants would be to only allow the card bearer to use the payment processing device 100 for payment if the card bearer's signature is successfully authenticated by the payment processing device 100 in this manner.

According to another optional feature, the magnetic strip 200 provided on the card 100 can be an active magnetic strip that can be activated and deactivated by the processor 218. The term, "Active magnetic strip" refers to a magnetic strip that allows the magnetic data encoded thereon to be read by a card reader only when the magnetic strip 200 is activated. When the magnetic strip 200 is de-activated, the card reader will not be able to access the data stored on the magnetic strip 200. Thus, a card 100 provided with such active-type magnetic strip 200 can be configured so that the magnetic strip 200 is normally in a de-activated state and activated by the processor 218 only when the card bearer's input signature information has been authenticated. In some embodiments, the activation of the active magnetic strip 200 would be temporary and would last only for a pre-determined length of time and then the magnetic strip 200 would automatically return to a deactivated state. The processor 218 can control the supply of power from the power source 220 to the active magnetic strip 200. This feature can be used to add an additional level of security so that if the input signature information from the card bearer is not authenticated by the processor 218, the card 100 will not be useable. This prevents use of the card without signature authentication or following a failed authentication attempt, in the event the merchant chooses to ignore the failed authentication message displayed on the display unit 209.

As used herein, the processor 218 may include a chip or logic processor configured to acquire, store, verify, analyze and authenticate unique user input signature information. It is understood by those known in the art that instructions for authentication methods and device embodiments may be stored on a non-volatile programmable memory and executed by a processor 218. Non-volatile programmable memory is configured to be an application memory device, and may store information such as the primary account number, current balance information, and/or user's signature profiles. The non-volatile programmable memory can be provided on the processor 218 itself or alternatively provided as a separate memory device coupled to the processor 218. Some examples of a separate memory device include, but not limited to: a programmable read only memory (PROM), flash memory, Electrically Erasable Programmable Read-Only Memory (EEPROM), or any other non-volatile computer memory or storage known in the art.

The card 100 can also have a contactless radio frequency unit 216, either in combination with the magnetic strip 200 as part of the card's communication element or as the only communication element. The contactless radio frequency unit 216 would be activated and deactivated by the processor 218 to allow use of the card 100 only when the input signature information of the card bearer has been authenticated against the authorized card holder's signature profile. An example of the contactless radio frequency unit 216 is the payWave system used by some merchants.

The processor 218 may also be configured to permanently lock the communication element 200 (such as the active magnetic strip or the contactless radio frequency unit) when a predetermined number of unsuccessful attempts are made to authenticate the card bearer's signature.

Figure 5:
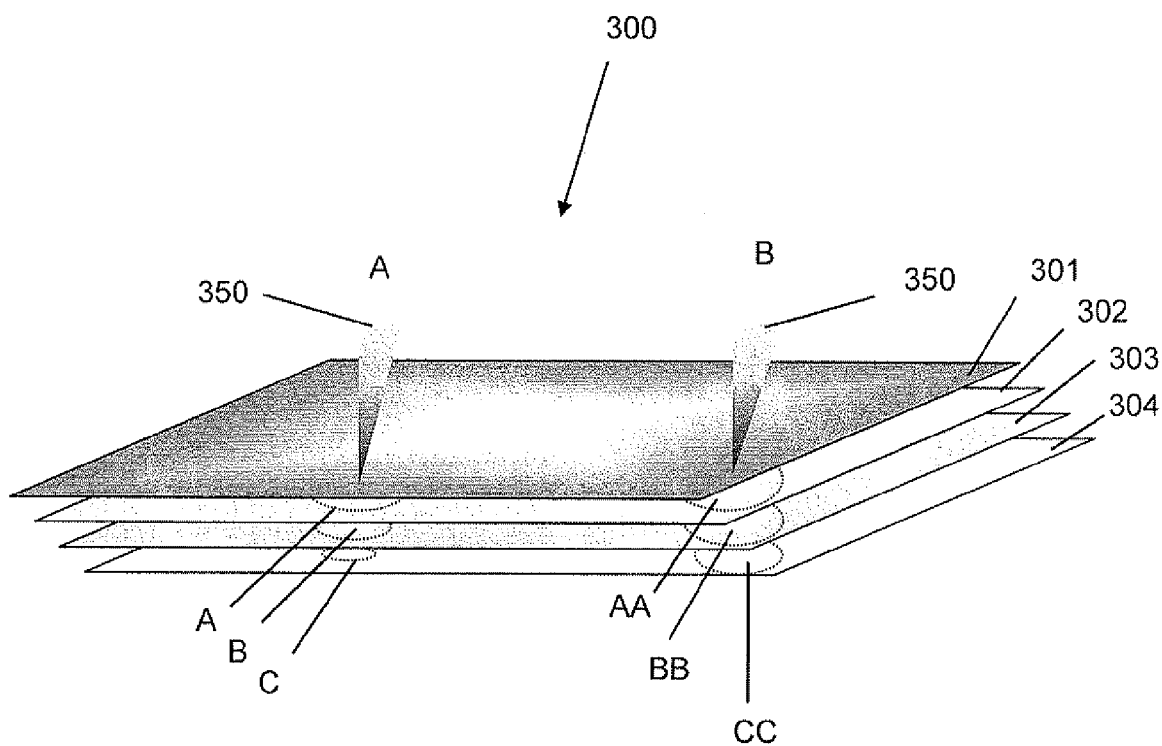
FIG. 5 is a schematic illustration of an aspect of the structure of a signature input panel according to an embodiment.

FIG. 5 is a schematic illustration of an example of the structure of the signature input panel 210. A person can write her signature on the surface of the signature input panel 210 using a stylus similar to the way a signature is written on signature pads found on many conventional point-of-sale payment devices. In some embodiments, the signature input panel 210 captures a digitized image of the person's signature and creates a 2-dimensional digitized image of the signature. In other embodiments, the signature input panel 210 of the present disclosure captures 4-dimensional characteristic parameters on the signature written thereon: pressure, speed, x and y coordinates (i.e. the shape of the signature).

As shown in FIG. 5, in one embodiment, the signature input panel 210 is comprised of a pressure-sensitive matrix 300 that comprises a laminated matrix having a plurality of sensing layers. In the illustrated example, four sensing layers 301, 302, 303 and 304 are shown. The signature input panel 210 captures the digitized image of the signature written on the surface layer 301 by registering the X and Y coordinates of the points on the signature. In some embodiments, the plurality of sensing layers 301, 302, 303, 304 allows sensing the changes in the pressure exerted by the writer throughout the signature. Each of the sensing layers is a 2-dimensional matrix of contact points that are activated when the contact points come in contact with the neighboring sensing layer. When pressure is exerted on the top surface sensing layer 301 and cause one or more pairs of the sensing layers to come in contact with one another, that contacting point is registered as an activated pixel on the signature input panel 210. The processor 218 coupled to the signature input panel 210 captures this data.

Thus, when the user writes her signature on the signature input panel 210 using a writing instrument 350, the pressure exerted by the writing instrument 350 causes one or more pairs of the plurality of sensing layers 301, 302, 303 and 304 to contact one another and the signature input panel 210 registers and captures the signature.

In some embodiments, the signature input panel 210 is also configured to detect and register changes or variations in the pressure exerted by the writing instrument 350. In FIG. 5, the location A represents a location where the writing instrument 350 is exerting less pressure on the signature input panel 210 than at the location B. The contact areas between each successive pair of the sensing layers underneath the writing instrument 350 are schematically illustrated by the circles A, B, and C beneath location A and the circles AA, BB, and CC beneath location B.

At location A, the contact areas represented by the size of the circles A, B and C are successively smaller further away from the top layer 301. This is because the pressure exerted by the writing instrument 350 at location A is not great enough to reach the bottom layer 304. The size of the contact areas A, B and C is measured by the number of activated pixel points between each pair of the sensing layers. For example, because the contact area A is larger than the contact area B, there would be more activated pixel points between the sensing layers 301 and 302 than between the sensing layers 302 and 303.

At location B, the contact areas represented by the size of the circles AA, BB and CC are more uniform compared to location A. This is because when the pressure exerted by the writing instrument 350 is greater, more of the pressure is transferred deeper into the plurality of sensing layers, Thus, by monitoring the uniformity of the number of activated points between each successive pair of the sensing layers 301, 302, 303 and 304, the signature input panel 210 can measure the changes in the pressure exerted by the user as she writes her signature on the signature input panel 210. Because the part of the unique characteristics of the way a person writes her signature includes the variations in the pressure exerted with the writing instrument, the pressure variation information can be used in combination with the shape of the signature by the processor 218 to authenticate the signature inputted by a card bearer.

The payment processing device 100 can also be configured to measure the variations in the writer's speed at which the signature is written. In one embodiment, the processor 218 can use its clock function to measure the velocity of the writing instrument 350 as the user is writing her signature. Because one of the unique characteristics of the way a person writes her signature includes the variations in the speed, the speed variation information can also be used in combination with the shape of the signature, or in combination with the shape of the signature and the pressure variation, to authenticate the signature inputted by a card bearer.

Thus, the payment processing device 100 captures 4-dimensional characteristic parameters: pressure, speed, x and y coordinates (i.e. the shape of the signature), on the signature being written on the signature input panel 210. The processor 218 temporarily stores this input signature information and compares the information to a pre-stored card owner's signature profile. The card owner's signature profile comprises a set of 4-dimensional characteristic parameters: pressure, speed, x and y coordinates, representing the card owner's signature and is stored in the payment processing device 100.

Thus, the signature data comparison is performed by the processor 218 using an algorithm that compares the 4-dimensional characteristic parameters of the input signature information to the 4-dimensional characteristic parameters of the pre-stored authorized card owner's signature profile. Because of slight variations in the 4-dimensional characteristic parameters that would exist in human written signatures, the comparison algorithm allows for these variances. In other words, because certain amount of variations will exist between two signatures written by one person, the signature data comparison algorithm may be configured to expect certain amount of variations in the 4-dimensional characteristic parameters.

Figure 6:
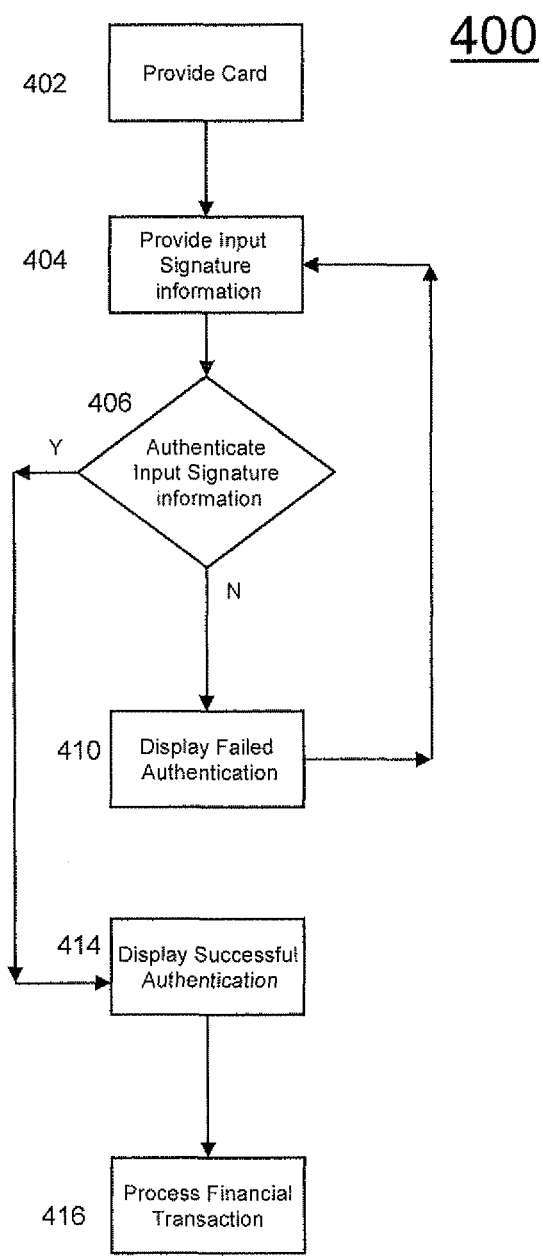
FIG. 6 is a flow chart of an exemplary method for verifying the signature of a bearer of a payment processor card.

Referring to FIG. 6, an exemplary method is illustrated in a flow chart 400. A payment processing device 100 (e.g. a credit card) having a pre-stored digital representation of the authorized card holder's signature is provided by an issuing financial institution (see block 402). At the point-of-sale location, the user card bearer provides the input signature information by writing her signature in the signature input panel 210 of the card 100 (see block 404). Next, the processor 218 of the card 100 authenticates the card bearer's signature by comparing the input signature information to the pre-stored authorized card owner's signature profile (see block 406). If the card bearer's signature is successfully authenticated, the processor 218 displays a message on the display unit 209 indicating the positive authentication result (see block 414). This message tells the merchant that the card bearer's signature matches the representation of the card owner's signature stored in the card, and that the financial transaction can be safely processed using the card 100 (see block 416). If the card bearer's signature fails to be authenticated, the processor 218 displays the negative authentication result on the display unit 209 (see block 410). Next, the card bearer can attempt to authenticate the signature again (see block 404).

Figure 7:
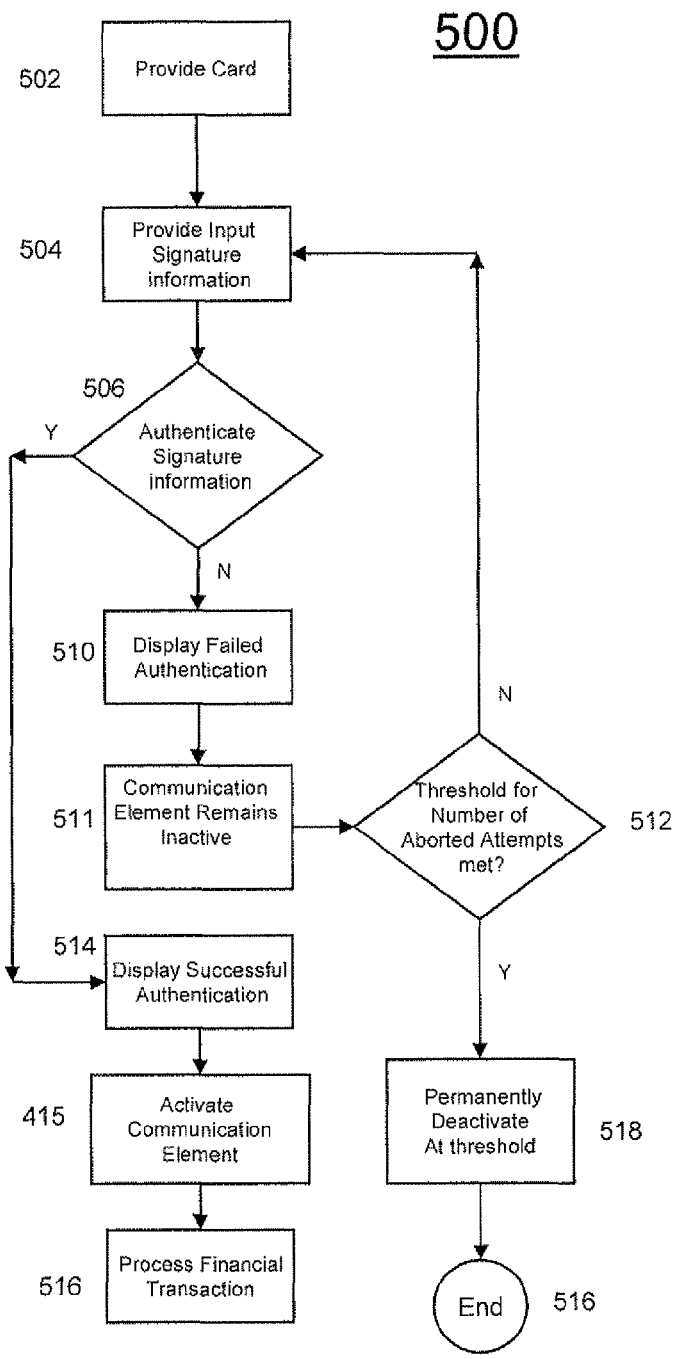
FIG. 7 is a flow chart of another exemplary method of verifying the signature of a bearer of a payment processor card.

Referring to FIG. 7, another example of a method is illustrated in a flow chart 500. A payment processing device 100 (e.g. a credit card) having a pre-stored digital representation of the authorized card holder's signature is provided by an issuing financial institution (see block 502). At the point-of-sale location, the user card bearer provides the input signature information by writing her signature on the signature input panel 210 of the card 100 (see block 504). Next, the processor 218 of the card 100 authenticates the card bearer's signature by comparing the input signature information to the pre-stored authorized card owner's signature profile (see block 506). If the card bearer's signature is successfully authenticated, the processor 218 displays a message on the display unit 209 indicating the positive authentication result (see block 514). In this example, the communication element 200 of the card 100 is an active type such as the active magnetic strip and/or the contactless radio frequency unit discussed above and the processor 218 activates the communication element 200 next (see block 515). The merchant can then process the financial transaction (see block 516). If the card bearer's signature fails to be authenticated, the processor 218 displays the negative authentication result on the display unit 209 (see block 510). The communication element remains in its default inactive state (see block 511). Next, the processor 218 determines whether a pre-determined threshold for the allowable number of unsuccessful signature authentication attempts has been reached (see block 512). If the threshold has been reached, the processor 218 can be configured to permanently deactivate the communication element of the card 100 (see block 518).

According to an aspect of the disclosure, an additional security measure may be incorporated where the card issuing entity may have a master lock combination that may be input into a permanently disabled card 100 to reset the card and allow further attempts at signature activation. The resetting feature minimizes the amount of replacement cards that would be necessary if permanent deactivation occurs. Such resetting service can be provided by the issuing institution at their local branches for the card owner's convenience. If the threshold has not been reached, the card bearer can attempt to authenticate the signature again (see block 504). For example, the threshold may be set to three consecutive unsuccessful authentication attempts.

The authorized card owner's pre-stored signature profile information may be stored in the card's non-volatile memory by a number of ways. In one example, the signature profile information is established and stored into the card 100 by the authorized owner of the card 100 during the initial receipt and activation of the card. After the card owner receives the card 100 from the issuing entity, the card owner may be requested to call the issuing entity to activate the account associated with the card. Then, when the card owner inputs her signature into the signature input panel 210, the 4-dimensional characteristic information about the signature, discussed above and referred to as the "signature profile information", is stored in the card's memory by the processor 218. During the card activation process, the card holder can be required to enter her signature multiple times to allow the processor 218 to establish average values for the characteristic information that will form the "signature profile information."

According to another example, the authorized card owner may be required to appear at a designated branch location of the card issuing entity where the authorized card owner's signature data can be collected by the issuing entity on a standalone device similar to the signature input panel 210 that is dedicated to collecting signature profile information. The issuing entity can then store or download the signature profile information into the memory of the card 100 being issued to the authorized card owner.

As used herein, payment processor device embodiments of the present invention may include, for example, payment cards, contact cards, credit cards, debit cards, stored value cards, pre-paid cards, and contactless cards. As used herein, a payment processor card device may be broadly understood as being a portable payment processing device associated with an account within a payment system. The account may be a credit account, a debit account, a stored value account such as, for example, a pre-paid account, an account accessible with a gift card, an account accessible with a reloadable card. Suitable payment card embodiments may include a card or other payment devices with a solid support, such as for example, plastic support such as PVC and ABS plastic. The card may contain imprinted features and/or a hologram to avoid counterfeiting.

As used herein, signature verification applications may be used alone or integrated with other technologies such as smart cards, encryption keys and biometric verification, to enhance security.

Although examples described above include a display for outputting the result of the authentication, other output devices may be used. In some alternative embodiments, Card 100 has a pair of light emitting diodes (LEDs, not shown). In one example, an LED having a first color (e.g., green) indicates successful authentication, and an LED having a second color (e.g., red) indicates a failed authentication attempt. In other alternative embodiments, card 100 contains one or more embedded sound emitting devices. In one embodiment, one sound emitting device emits a continuous tone to indicate successful authentication, and two sound emitting devices emit alternating tones of different pitches to indicate a failed authentication attempt.

Although the invention has been described in terms of examples, it is not limited thereto. Rather, the appended claims should be construed broadly, to include other variants and embodiments of the invention, which may be made by those skilled in the art without departing from the scope and range of equivalents of the invention.

One or more features from any embodiment may be combined with one or more features of any other embodiment without departing from the scope of the invention. A recitation of "a", "an" or "the" in the above description is intended to mean "one or more" unless specifically indicated to the contrary. It will be further understood that the terms "comprises," "comprising," "includes" and/or "including" when used in this specification, specify the presence of stated features, steps, operations, elements, and/or components, but do not preclude the presence or addition of one or more other features, steps, operations, elements, components, and/or groups thereof.

What is claimed is:

1. A method of authenticating a user of a card during a financial transaction, comprising:
    capturing user input signature information comprising changes in 4-dimensional characteristic parameters of the user's signature on a signature input panel provided in the card, wherein the signature input panel comprises a plurality of sensing layers and is configured to measure changes in pressure when pressure is exerted on the signature input panel by monitoring a number of activated pixel points between successive pair of the sensing layers;
    comparing the user input signature information to a pre-stored signature profile; and
    outputting results of the comparing of the user input signature information from an output device provided in the card.

2. The method of claim 1, wherein the pre-stored signature profile comprises 4-dimensional characteristic parameters of a reference signature.

3. The method of claim 2, wherein the card is configured to recognize pressure, speed and X and Y coordinates of the user's signature.

4. The method of claim 1, further comprising: activating a communication element provided in the card when the user input signature information matches the pre-stored signature profile; and
    maintaining a deactivated status for the communication element when the user input signature information does not match the pre-stored signature profile.

5. The method of claim 4, wherein the communication element is an active magnetic strip.

6. The method of claim 1, further comprising:
    deactivating, by the card, all functions of the card after a predetermined number of consecutive unsuccessful comparison of the user input signature information to the pre-stored signature profile.

7. A method for authenticating a user of a card during a financial transaction, comprising:
    capturing a user input signature information comprising changes in 4-dimensional characteristic parameters of the user's signature on a signature input panel provided in the card, wherein the signature input panel comprises a plurality of sensing layers and is configured to measure changes in pressure when pressure is exerted on the signature input panel by monitoring a number of activated pixel points between successive pair of the sensing layers;
    authenticating the user input signature information;
    outputting an indication of results of the authentication;
    activating a communication element provided in the card when the user input signature information is successfully authenticated; and
    maintaining a deactivated status for the communication element when the user input signature information is not authenticated.

8. The method of claim 7, wherein authenticating the user input signature information comprises comparing the user input signature information against a pre-stored signature profile.

9. The method of claim 8, wherein the pre-stored signature profile comprises 4-dimensional characteristic parameters of a reference signature.

10. The method of claim 7, further comprising:
    deactivating, by the card, all functions of the card after a predetermined number of consecutive unsuccessful attempts to authenticate the user input signature information.

11. A non-transitory machine-readable storage medium, encoded with a computer program code, such that, when the computer program code is executed by a processor, the processor performs a method for authenticating a user of a card during a financial transaction comprising:
    capturing a user input signature information comprising changes in 4-dimensional characteristic parameters of the user's signature on a signature input panel provided in the card, wherein the signature input panel comprises a plurality of sensing layers and is configured to measure changes in pressure when pressure is exerted on the signature input panel by monitoring a number of activated pixel points between successive pair of the sensing layers;
    comparing the user input signature information to a pre-stored signature profile; and outputting results of the comparing of the user input signature information from an output device provided in the card.

12. The non-transitory machine-readable storage medium of claim 11, wherein the pre-stored signature profile comprises 4-dimensional characteristic parameters of a reference signature.

13. The non-transitory machine-readable storage medium of claim 12, wherein the card is configured to recognize pressure, speed and X and Y coordinates of the user input signature.

14. The non-transitory machine-readable storage medium of claim 11, wherein the method further comprises:
  activating a communication element provided in the card when the user input signature information matches the pre-stored signature profile; and
  maintaining a deactivated status for the communication element when the user input signature information does not match the pre-stored signature profile.

15. The non-transitory machine-readable storage medium of claim 14, wherein the communication element is an active magnetic strip.

16. The non-transitory machine-readable storage medium of claim 11, wherein the method further comprises:
  deactivating, by the card, all functions of the card after a predetermined number of consecutive unsuccessful comparison of the user input signature information to the pre-stored signature profile.

* * * * *